United States Patent [19]
Witzel

[11] 3,908,697
[45] Sept. 30, 1975

[54] ROTARY FLUID VALVE

[75] Inventor: Hans G. Witzel, Berlin, Conn.

[73] Assignee: Polymer Machinery Corporation, Berlin, Conn.

[22] Filed: Oct. 30, 1973

[21] Appl. No.: 411,171

[52] U.S. Cl............................. 137/625.47; 251/160
[51] Int. Cl.² ................. F16K 11/083; F16K 25/00
[58] Field of Search..... 137/625.19, 625.43, 625.46, 137/625.47; 251/160

[56] References Cited
UNITED STATES PATENTS

| | | | |
|---|---|---|---|
| 955,611 | 4/1910 | Stevens | 137/625.19 X |
| 1,188,085 | 6/1916 | Krupp | 137/625.19 |
| 1,485,720 | 3/1924 | Sage | 137/625.19 |
| 1,958,262 | 5/1934 | Boland | 251/160 |
| 2,088,632 | 8/1937 | Benjamin | 137/625.19 X |
| 2,974,923 | 3/1961 | Herman | 251/160 |
| 3,194,271 | 7/1965 | Viessmann | 137/625.43 |
| 3,499,467 | 3/1970 | McCord et al. | 137/625.19 |

Primary Examiner—Henry T. Klinksiek
Attorney, Agent, or Firm—Spencer & Kaye

[57] ABSTRACT

A fluid valve including a housing having a conically tapered through bore and a pair of diametrally opposed openings, and a frustoconical movable valve member within the housing. The movable valve member is mounted within the housing so that it is rotatable about and movable along the longitudinal axis of the housing. The movable valve member includes two spaced parallel solid discs extending transverse to the longitudinal axis of the bore and a solid web interconnecting the discs and extending along an entire diameter of each of the discs. The spacing between the discs is greater than the size of the openings and the peripheral edge surfaces of the discs and of the web lie on a conical surface with the same angle of taper as the bore of the housing, thereby when the surface of the movable valve member engages the surface of the bore the openings in the housing will be situated between the discs.

12 Claims, 6 Drawing Figures

ROTARY FLUID VALVE

BACKGROUND OF THE INVENTION

The present invention relates to an improved rotary fluid valve. More particularly, the present invention relates to an improved rotary valve which may be utilized for distribution of air at elevated temperatures.

In order to allow large quantities of air to pass through a valve, it is common in the art to use either flapper or butterfly valves. In such rotary type valves, the movable element of flap is either fastened at one end to a shaft (flapper valve) or is fastened to a shaft at the center thereof (butterfly valve). To operate the valve so as to switch the fluid or air from the inlet to one or more outlets, the flap is simply swung by rotation of the shaft from one position to another.

Another type of valve which is well known for fluid applications is a sliding spool valve. In such valves, a cylindrical spool-type movable element is axially shifted along the bore of the housing to selectively connect the inlet to the outlets. Such valves are much more common for hydraulic applications than for air applications since the spool would have to be very large and the stroke very long in order to achieve sufficient air throughputs.

While the above-mentioned types of valve operate satisfactorily for many types of applications, these valves do have the disadvantage that as a result of the fact that they must be machined to rather close tolerances in order to provide a reasonable tight fit, they exhibit a tendency to bind. This tendency is particularly acute when the valves are used under elevated temperatures, for example as fluid distribution valves in hot air dryers for plastic material.

SUMMARY OF THE INVENTION

It is therefore an object of the present invention to provide an improved rotary fluid valve arrangement which, while providing a tight fit between the relatively movable parts, avoids the binding problems of the prior art valves, and thus can be utilized effectively at elevated temperatures.

The above object is achieved according to the present invention by providing a fluid valve including a housing having a conically tapered through bore and a pair of diametrally opposed openings, and a frustoconical movable valve member which is mounted within the bore so that it is rotatable about the longitudinal axis thereof and movable along the axis. The movable valve member has two spaced parallel solid discs extending transverse to the longitudinal axis of the bore and a solid web member interconnecting the discs and extending along an entire diameter of each of the discs. The peripheral edge surfaces of the discs and of the web lie on a conical surface with the same angle of taper as the bore and the spacing between the discs is greater than the size of the diametrally opposed openings in the housing, so that when the movable valve member is seated in the bore so that its conically tapered surface engages the surface of the bore the openings in the housing will be situated between the pair of discs.

With the above-described valve according to the invention, which simulates a butterfly valve, the radial position of the web member is changed by initially moving the movable valve member along the axis of the housing so as to unseat same from the bore, and is only again seated after rotation of the movable valve member to its desired position. Thus, the valve arrangement according to the invention provides a tight fit when the movable member is in a stationary or seated position, and eliminates binding or friction during rotation thereof.

According to a further advantageous feature of the invention, particularly when the valve is to be utilized by elevated temperatures, the cone angle of the bore and of the movable valve member is selected sufficiently large, at least 16°, so that the two members will be self-releasing.

According to a further feature of the invention, means are provided which cooperate with the movable valve member to automatically move same along the axis of the bore and rotate same to the desired radial position.

According to still a further feature of the invention, the valve may be a four-way valve by simply providing the housing with two pairs of diametrally opposed openings with the axes of the two pairs being perpendicular to one another and intersecting the longitudinal axis of the housing at a common point. Additionally, a plurality of valves according to the invention may be provided in tandem within a common housing utilizing a movable valve member which includes at least three of the solid spaced parallel discs and web members which interconnect adjacent pairs of the discs.

DETAILED DESCRIPTION OF THE PREFERRED EMBODIMENTS

Figure 2:
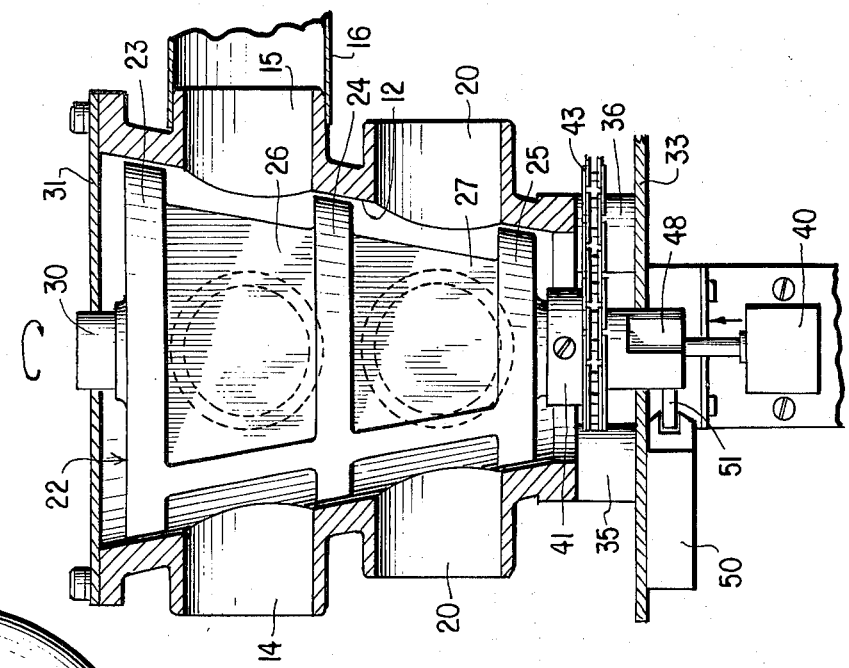
FIG. 2 is an elevational view, partially in section, of the embodiment of FIG. 1 showing the movable valve member in a raised position.
Figure 3:
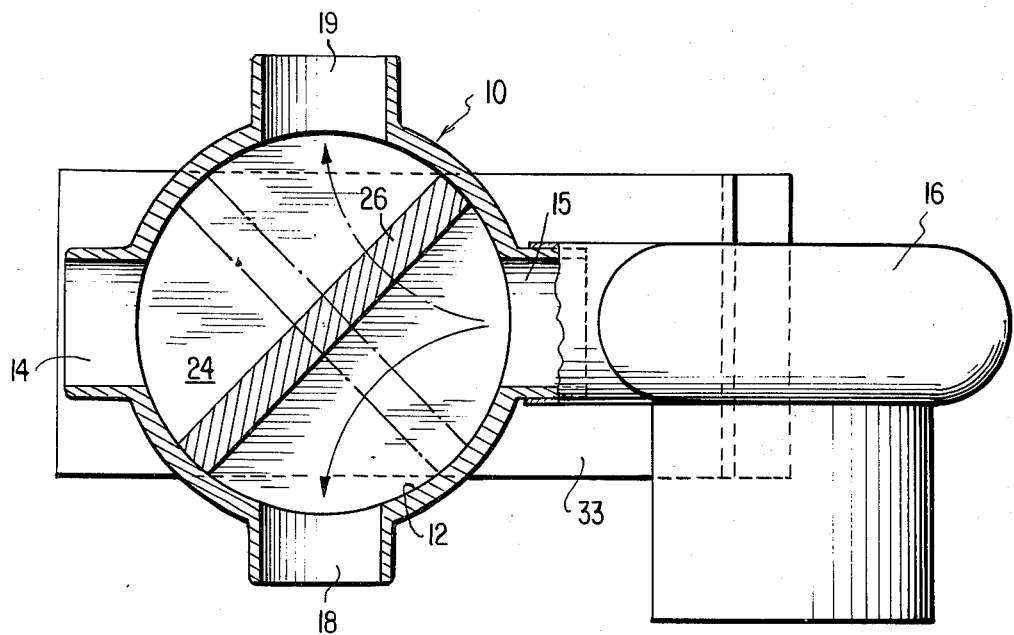
FIG. 3 is a horizontal sectional view taken along the line 3—3 of FIG. 1.
Figure 4:
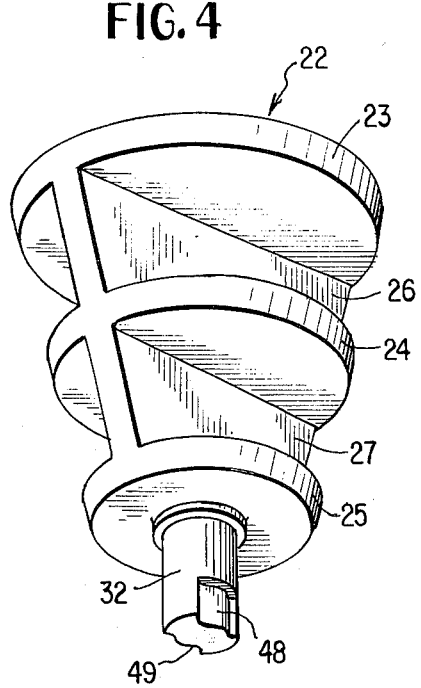
FIG. 4 is a perspective view of the movable valve member.

Referring now to FIGS. 1 to 5, there is shown a preferred embodiment of a valve arrangement according to the invention which in effect constitutes two four-way distribution valves connected in tandem which utilize a common housing and a common movable valve element. As shown in the figures, the valve arrangement according to the invention basically comprises a housing 10 of metal or other suitable material having a conically tapered through bore 12. In order to provide fluid flow inlets and outlets to the housing 10, the sidewall of the housing 10 is provided with at least one pair of diametrally opposed openings 13, 15 which terminate in outwardly directed annular flanges to which hoses or the like, for example, a blower 16, may be connected. Since, as indicated above, the preferred embodiment of the valve is a four-way rotary valve, the housing 10 is provided with at least a second pair of diametrally opposed openings 18, 19, (as best seen in FIG. 3) whose axis intersects that of the openings 14, 15. Additionally, since the illustrated embodiment of the valve is in effect to be two valves connected in tandum, the housing 10 is further provided with two additional pairs of diametrally opposed openings 20 and 21 (only one of which is shown in the drawings) which are arranged similarly to the pairs of openings 14,15 and 18,19, but which are spaced therefrom along the longitudinal axis of the housing 10.

Figure 1:
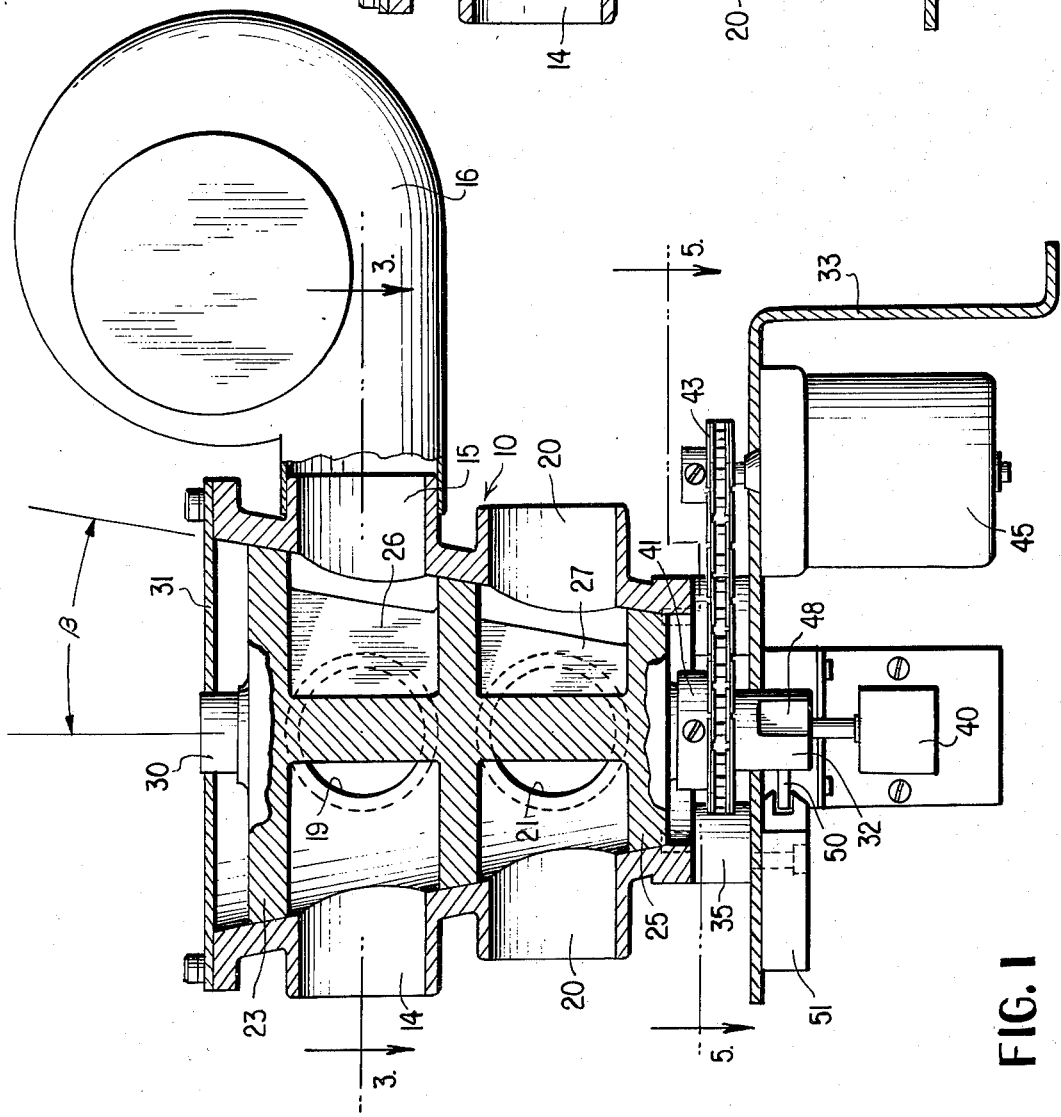
FIG. 1 is an elevational view, partially in section, illustrating a valve arrangement according to the invention with the movable member seated in the housing.

Mounted within the housing 10 is a frustoconical movable valve member 22 whose angle of taper is the same as that of the bore 12. The movable valve member 22 basically comprises a plurality of solid parallel spaced discs 23, 24, and 25 which extend transverse to the longitudinal axis of the housing 10 and a pair of solid flat web members 26, 27, which extend along the longitudinal axis of the housing 10. Each of the web members 26, 27, interconnects an adjacent pair of the discs i.e. web 26 interconnects discs 23, 24, while web 27 interconnects discs 24 and 25, and extends along an entire diameter of each of the interconnected discs 23 and 24 or 24 and 25. Consequently the peripheral edge of the webs 26, 27, as well as that of those of the discs 23 to 25 will lie on a conical surface having the same angle of taper as the bore 12. As shown in FIG. 1, the length of each of the webs 26 and 27 in the direction of the longitudinal axis of the bore 12 is greater than the diameter or longitudinal dimension of the openings in the housing associated therewith so that when the movable valve element 22 is seated in the housing 10, each pair of discs, 23, 24, and 24, 25, will straddle and seal the associated openings. That is, the openings 14, 15, and 18, 19 will be situated between the discs 23 and 24 while the pairs of openings 20 and 21 will be situated between the discs 24 and 25. Preferably, as illustrated, the housing 10 is vertically oriented and has its bore tapering in a downward direction so that the frustoconical movable valve member 22 will seat itself in the bore by its own weight.

As mentioned above, the movable member 22 is to be mounted in the housing 10 so that it is movable both about and along the longitudinal axis of the bore 12. In order to support the movable member 22 within the housing 10 so that it is movable in this manner, the movable member 22 is provided with an axial shaft 30 which extends from the upper surface of the disc 23, and the housing 10 is provided with a cover plate 31 which is provided with an axial opening (not shown). The shaft 30 extends through the opening in the cover plate 31 which opening serves as a radial bearing for the shaft 30. However, as can be clearly seen in the figures, the shaft 30 is not restrained in the longitudinal direction, and is consequently able to move along the longitudinal axis of the bore 12. Preferably, as illustrated the opposite end of the member 22 is also provided with an axial shaft 32 which is supported in a similar manner by means of an opening in a support plate 33 for the valve housing 10. It is to be noted, however, that if desired, a simple cover plate such as the upper cover plate 31 may be utilized at the lower end of the housing 10.

With the housing 10 and the movable valve member 22 as described above, and with the valve member positioned as shown in FIG. 3, the openings 14 and 19 will be connected together and the openings 15 and 18 will be connected together. In order now to change the direction of air flow of the illustrated four way valve so that the blower connected to the opening 15 will be in communication with the opening 19, it is necessary to rotate the movable member 22, and consequently the web 26, to the position shown in dotted lines. According to the present invention, this is accomplished by raising the movable valve member 22 so that the peripheral surfaces of the discs 23 to 25 and of the webs 26 and 27 no longer engage the surface of the bore 12. This raised position of the movable valve member 22 is illustrated in FIG. 2. While in the raised position, the movable valve member 22 is then rotated to the position shown in dotted lines and then lowered so that it again seats itself in the bore 10. As a result of this axial movement so as to unseat the movable valve member from the bore prior to rotation, the problems of binding and of friction are eliminated, while still permitting a very tight fit when the movable valve member is seated in the bore.

Figure 5:
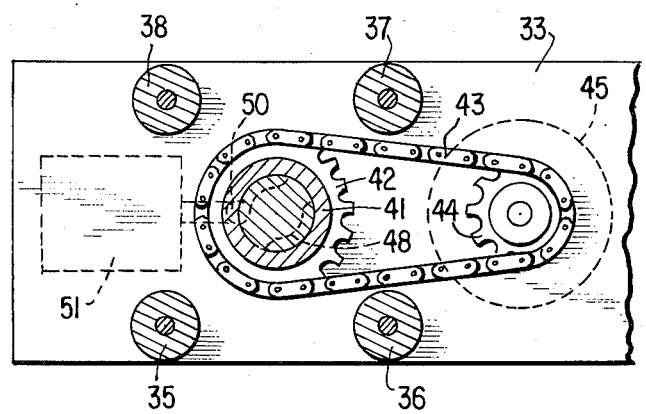
FIG. 5 is a horizontal sectional view taken along the line 5—5 of FIG. 1.

Although this lifting and rotational movement may be performed manually, for example, by attaching a handle to the end of the shaft 30, preferably apparatus is provided for automatically and controllably moving the valve member 22. As shown in FIGS. 1, 2 and 5, the housing 10 is secured to one surface of the support plate 33 and is spaced therefrom by a plurality of spacers 35 to 38. As mentioned above, the shaft 32 extends through an opening in the plate 33 which serves as a radial bearing for the shaft 32. In order to move the valve member 22 along the longitudinal axis of the housing 10, a solenoid 40 is fastened to the lower surface of the support 33 and positioned beneath the end of the shaft 32. As shown in FIG. 2, energization of the solenoid 40 will cause the movable member 22 to be raised a distance sufficient to disengage the peripheral surface thereof from the surface of the bore 12.

To provide for the rotational movement of the movable valve member 22, the axial shaft 32 is provided with a collar 41 bearing a chain sprocket wheel 42 which is connected by an endless chain 43 to a further sprocket wheel 44, which in turn is driven by a motor 45 fastened to the support plate 33. Although drive connections other than a chain 43 may be utilized, it is to be understood that the drive connection must be flexible in the sense that it will permit axial movement of the driven shaft 32, i.e. up and down movement in the illustrated embodiment.

Since the illustrated embodiment of the valve arrangement according to the invention is a four-way rotary valve, and consequently only a rotational movement of 90° is necessary in order to switch the valve between the two positions illustrated in FIG. 3, it is desirable that the motor 45 be controlled in such a manner so as to stop the rotation after a 90° turn each time the motor is energized. In order to achieve this result, the surface of the shaft 32 is provided with a pair of oppositely disposed cut-out camming surfaces 48, 49 which cooperate with a cam follower control element 50 of a limit switch 51 connected in series with the motor 45. The camming surfaces 48, 49 and the limit switch 51 serve to de-energize the motor 45 after it has produced a rotation of 90°. A simple circuit for performing this function is shown in FIG. 6.

As shown in this figure, the control circuit basically includes a single pole double throw energizing switch 53 which is connected in series between the energy source 54 and the limit switch 51, which is also a single pole double throw switch. The solenoid 40 and the motor 45 are connected in parallel with each other and in series with the limit switch 51 and the source 54. The switches 51 and 53 are shown in their normal positions relative to one another with the circuit not energized. The switch 53, may be for example a timer so that the position of the valve will be switched at predetermined intervals.

Figure 6:
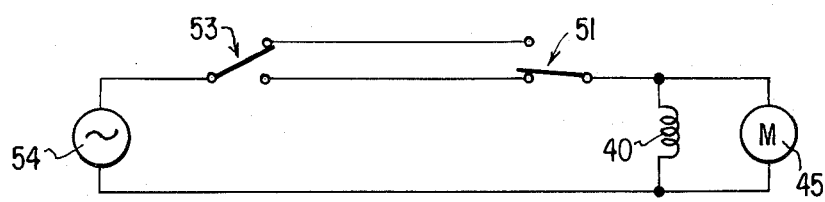
FIG. 6 is an electrical circuit diagram of a circuit for positioning the movable valve member.

In the operation of the circuit of FIG. 6, and with the control element 50 of the switch 51 positioned in the cam surface 49 as shown in FIG. 5, switching of the movable contact of switch 53 to its normally open position will result in the completion of the circuit, and consequently the energization of the solenoid 40 and the motor 45. Rotation of the shaft 32 will cause the cam follower 50 to move along the cam surface 49 until it reaches the end thereof, at which time the switch 51 will be switched to its normally open position, thereby breaking the circuit and de-energizing the motor 45 and the solenoid 40 and permitting the movable valve member 22 to again seat itself in the housing 10, but at the new position. Subsequent switching of the movable contact of the switch 53 back to its illustrated position will then result in again completing the circuit to again energize the solenoid 40 and the motor 45 so as to move the valve to its next position.

Although the valve arrangement thus far described will eliminate binding and frictional problems at normal room temperatures or slightly elevated temperatures, at very high temperatures the binding or wedging of the movable valve member 22 in the housing 10 might still occur as a result of heat expansion. For example, in the processing of plastics, in the hot air streams used in conjunction with beds of chemical drying agents to remove the moisture from the plastic material prior to processing, hot air temperatures of up to 600° F are often required, particularly for the air used to purge the chemical drying agent bed to regenerate same. At such high temperatures, any rotating or sliding valve that is reasonably tight fitting at normal room temperatures or slightly elevated temperatures would totally bind up as a result of the expansion of the movable valve element. In order to avoid this problem, and thus permit the valve arrangement according to the invention to be utilized at such high temperatures, the cone side angle $\beta$ (FIG. 1), i.e. the angle of taper, of the bore 12 and of the movable valve element 22 is selected to be at least 8°, resulting in a total enclosed angle of at least 16°. As a result of using a total enclosed cone angle of at least 16°, a self-releasing engagement is provided. That is, with a total enclosed cone angle of at least 16 degrees, expansion of the movable valve member 22 as a result of elevated temperatures will cause the movable valve member 22 to automatically push itself higher up inside the bore 12, rather than binding and wedging with same.

Although the valve arrangement according to the invention has been described for a four-way valve, it is to be understood that the invention is not limited to such an application. For example, the invention can also be utilized for a two-way valve if desired. Additionally, although the preferred embodiment shows an arrangement having two valves connected in tandum utilizing a single housing and movable element, it is to be understood that more than two valves may be provided within the single housing simply by providing additional pairs of openings in the housing and additional discs and web members on the movable element.

It will be understood that the above description of the present invention is susceptible to various modifications, changes and adaptations, and the same are intended to be comprehended within the meaning and range of equivalents of the appended claims.

I claim:
1. A fluid valve comprising in combination:
   a vertically oriented housing having a conically tapered through bore which narrows in a downward direction and a pair of diametrally opposed openings;
   a frusto-conical movable valve member normally seated within said bore by its own weight, said movable valve member including two spaced parallel solid discs extending transverse to the longitudinal axis of said bore, and a solid web member interconnecting said discs and extending along an entire diameter of each of said discs, the longitudinal spacing between said discs being greater than the longitudinal size of said openings and the peripheral edge surfaces of said discs and of said web lying on a conical surface with the same angle of taper as said bore, whereby when said surface of said movable valve member engages the surface of said bore said openings will be situated between said discs;
   an axial shaft connected to and extending from the lower surface of said movable valve member;
   means, including a radial bearing for said shaft, for mounting said movable valve member within said housing so that it is rotatable about said axis and movable along said axis, said means for mounting further including a support plate for said housing connected across the lower open end of said housing, said plate having an opening which is along said longitudinal axis of said bore and through which said shaft passes;
   first energizable means connected to said support plate and positioned below the end of said axial shaft for raising said movable valve member along said longitudinal axis when energized to unseat said movable valve member; and,
   second means, including energizable drive means mounted on said support plate and means for flexibly connecting said drive means to said axial shaft, for rotating said movable valve member about said longitudinal axis when said drive means is energized.

2. The valve as defined in claim 1 wherein the enclosed angle of said tapered bore is at least 16°.

3. The valve as defined in claim 1 wherein said means for flexibly connecting comprises a first sprocket wheel connected to said drive means, a second sprocket wheel mounted on said axial shaft and an endless chain belt mounted on said first and second sprocket wheels.

4. The valve as defined in claim 1 wherein said housing includes two pairs of diametrally opposed openings with the axes of said pairs being perpendicular to one another and intersecting said longitudinal axis at a common point whereby said valve is a four-way valve.

5. The valve as defined in claim 4 further including means for preventing said movable valve member from rotating more than 90° including a plurality of cam surfaces formed on said lower shaft, and electrical switch means cooperating with and controlled by said cam surfaces, said switch means being electrically connected in series with said drive means to control the energization thereof.

6. A fluid valve comprising in combination:

a vertically oriented housing having a conically tapered through bore which narrows in a downward direction and a pair of diametrally opposed openings;

a frusto-conical movable valve member normally seated within said bore by its own weight, said movable valve member including two spaced parallel solid discs extending transverse to the longitudinal axis of said bore, and a solid web member interconnecting said discs and extending along an entire diameter of each of said discs, the longitudinal spacing between said discs being greater than the longitudinal size of said openings and the peripheral edge surfaces of said discs and of said web lying on a conical surface with the same angle of taper as said bore, whereby when said surface of said movable valve member engages the surface of said bore said openings will be situated between said discs;

an axial shaft connected to and extending from one of said discs;

means, including a radial bearing for said shaft, for mounting said movable valve member within said housing so that it is rotatable about said axis and movable along said axis;

first energizable means cooperating with said shaft for raising said movable valve member along said longitudinal axis when energized to unseat said movable valve member;

second energizable means cooperating with said shaft for rotating said movable valve member about said longitudinal axis when energized; and means for limiting the angle of rotation of said movable valve means including a plurality of cam surfaces formed on said shaft, and electrical switch means cooperating with and controlled by said cam surfaces, said electrical switch means being electrically connected in series with each of said first and second energizable means for controlling the energization thereof.

7. The valve as defined in claim 6 wherein said means for mounting includes a plate connected across one of the open ends of said housing, said plate having an opening which is along said longitudinal axis of said bore and through which said shaft passes.

8. The valve as defined in claim 7 wherein said axial shaft extends from the upper surface of said movable valve member and wherein said plate is a cover plate for the upper end of said housing.

9. The valve as defined in claim 6 wherein said axial shaft extends from the lower surface of said movable valve member and wherein said plate is a support plate for said housing.

10. The valve as defined in claim 9 further comprising a further axial shaft connected to and extending from the upper surface of said movable valve member, and wherein said means for mounting further includes a cover plate for the upper end of said housing, said cover plate having an opening along said longitudinal axis of said bore through which said further shaft passes.

11. The valve as defined in claim 6 wherein said housing includes at least two pairs of diametrally opposed openings, said pairs of openings being spaced from each other along said longitudinal axis; said movable valve member includes at least three of said spaced parallel solid discs; and wherein a further of said web members is provided for interconnecting each pair of adjacent discs, the length of each of said webs being such that each of said pairs of openings will be situated between an adjacent pair of said discs when said peripheral edge surface of said movable valve element engages the surface of said conical bore.

12. The valve as defined in claim 6 wherein the enclosed angle of said tapered bore is at least 16°.

* * * * *